Dec. 11, 1951  P. E. WILLMAN  2,577,985
COFFEE MAKER
Filed June 26, 1947  2 SHEETS—SHEET 1
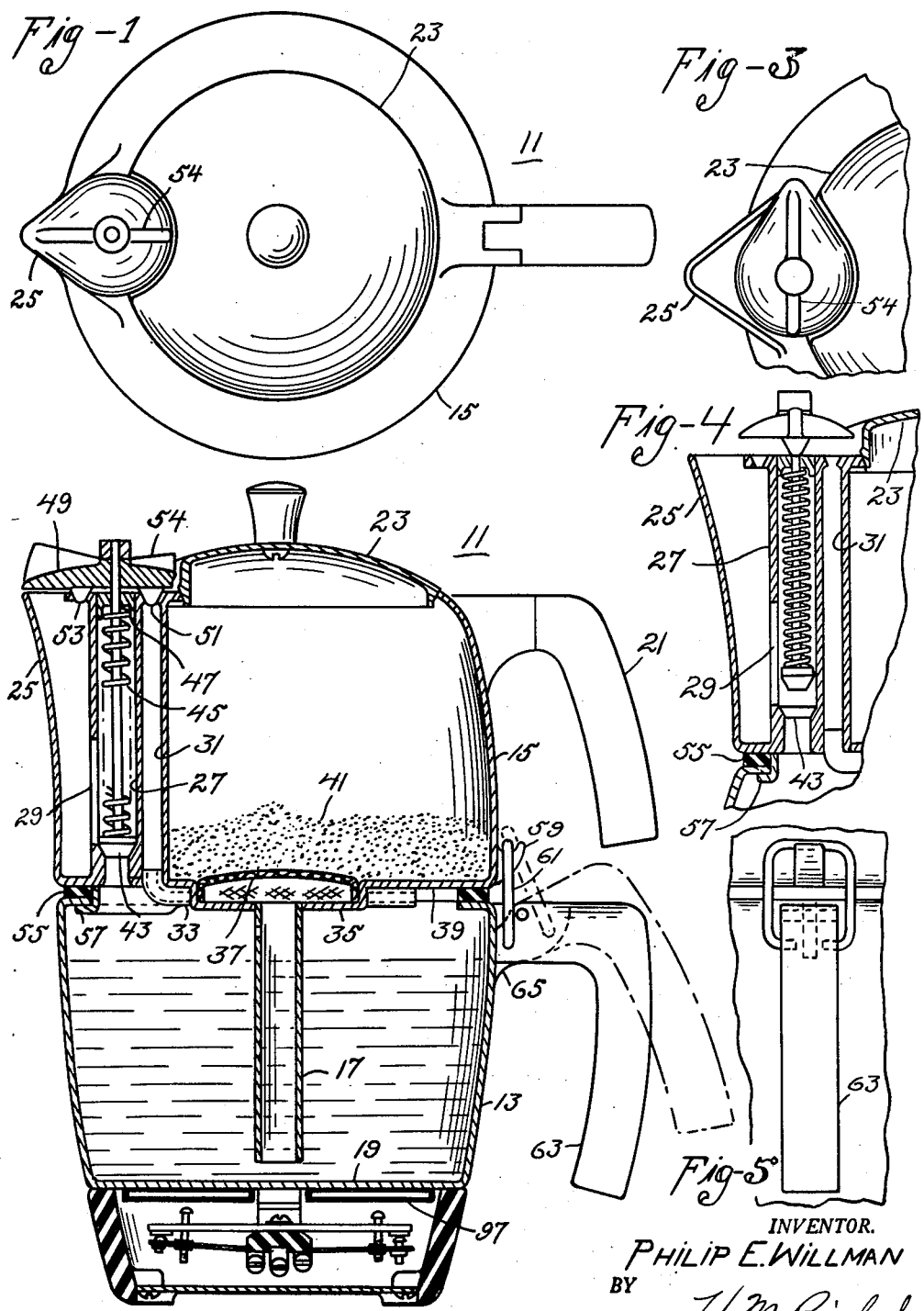
INVENTOR.
PHILIP E. WILLMAN
BY
H. M. Biebel
ATTY

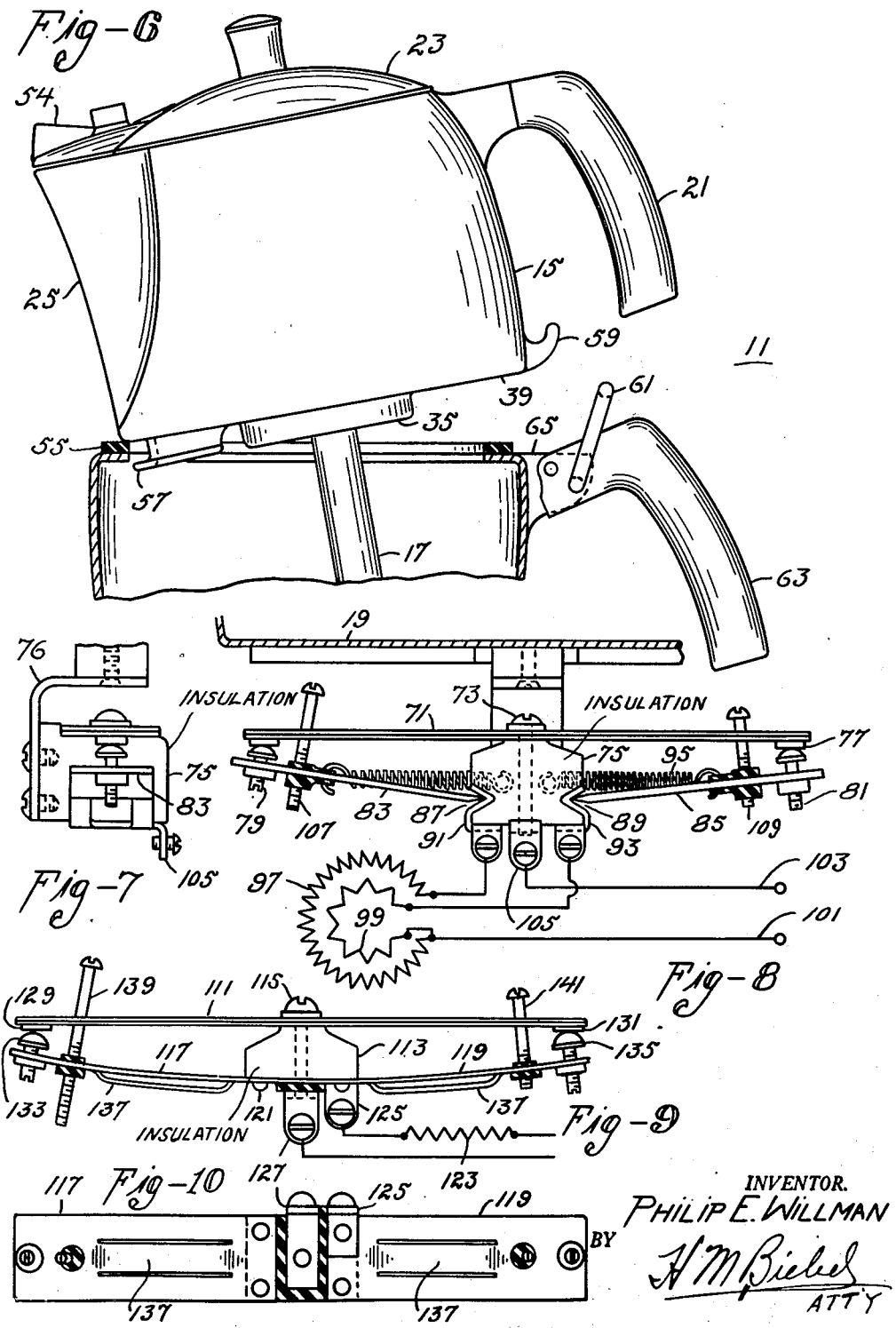

Patented Dec. 11, 1951

2,577,985

UNITED STATES PATENT OFFICE 2,577,985

COFFEE MAKER

Philip E. Willman, Chicago, Ill., assignor to McGraw Electric Company, Elgin, Ill., a corporation of Delaware Application June 26, 1947, Serial No. 757,150

5 Claims. (Cl. 99—292)

My invention relates to coffee makers and particularly to vacuum type coffee makers.

An object of my invention is to provide a new form of vacuum coffee maker.

Another object of my invention is to provide a novel means for controlling the operation of a vacuum type coffee maker.

Other objects of my invention will either be apparent from a description of several forms of device embodying my invention or will be pointed out during the course of such description and be particularly set forth in the appended claims.

In the drawings,

Figure 1 is a top plan view of a coffee maker shown in vertical section in Fig. 2, Fig. 2 is a vertical sectional view of a coffee maker embodying my invention, Fig. 3 is a fragmentary top plan view of the parts shown in Fig. 4, Fig. 4 is a fragmentary vertical sectional view of a part of Fig. 2 showing a coffee valve and an air vent in open condition, Fig. 5 is a fragmentary rear view of a part of Fig. 2, Fig. 6 is a side elevational view showing the upper portion of a coffee maker in position for removal from or insertion onto the lower portion, Fig. 7 is an end view of the parts shown in Fig. 8, Fig. 8 is a view in side elevation of a thermostat in connection with a diagram of electric circuits for controlling the operation of a coffee maker, Fig. 9 is a view in side elevation of another form of thermostat embodying my invention, and, Fig. 10 is a bottom plan view of the parts shown in Fig. 9.

A coffee maker 11 comprises a lower water container 13, an upper coffee container 15, which upper container is provided with a depending tubular member 17 which tubular member may extend to within a short distance above the bottom 19 of lower container 13. The upper container 15 is provided with a handle 21 and a cover 23. A spout 25 is provided in the upper container 15, which spout is adapted for the discharge or pouring of coffee from the lower container 13 through a tube 27 which extends throughout substantially the entire height of the upper container 15 and is provided with a front opening 29 therein.

I provide an air inlet tube 31 in the upper container 15 which is preferably positioned just in back of the tube 27 and has a lower tubular portion 33 which is adapted to extend around a central depressed portion 35 to which the tube 17 is connected. A filter 37 is adapted to be positioned in the depressed portion 35 of the bottom 39 of the upper container 15 to hold coffee grounds 41 within the upper container. Since it is necessary to provide a closed lower container 13 during the process of making or preparing the coffee extract I provide means for closing both tubes 27 and 31 at will. The means for closing tube 27 comprises a valve 43 which is spring-pressed against a seat in the lower end of tube 27 just below the opening 29 by a compression spring 45, the upper end of which engages a closing member 47 positioned at the end of tube 27. Means for closing the air inlet tube 31 as well as the tube 27 may comprise a manually actuable closure 49 which has a first projection 51 adapted to close air inlet tube 31 when fitted into a valve seat. A second projection 53 is provided on member 49 which, when fitted into a depression, is effective to hold the closure 49 in proper operative position to close both the coffee outlet valve as well as the air inlet valve when desired. When the coffee extract has returned to the lower container 13 the operator may open both the coffee outlet tube as well as the air inlet tube by turning closure 49 by projections 54 secured to the upper end or surface of closure 49 to a position substantially as shown in Figs. 3 and 4.

Means for ensuring a vacuum type closure or fit of the upper container 15 on the lower container 13 may comprise an annular gasket 55 which is secured against the upper surface of the lower container 13. The lower surface of the upper container 15 is provided with a lip 57 which extends around the front end of the upper end of the lower container for less than a semi-circle in order to permit of assembling the lip 57 in proper operative position underneath the inwardly flanged upper end of the lower container 13.

Means for clamping the upper container in close operative engagement against member 55 comprises a hook 59 secured to the rear side of casing 15 adjacent the lower end portion thereof. A rectangular ring 61 pivotally mounted on a lower handle 63, which lower handle is pivotally mounted on a projection 65, is effective to be hooked over the hook 59 with the handle tilted in a counterclockwise direction to substantially the position shown in Fig. 6, after which the ring 61 may be connected to hook 59 and the handle 63 may then be turned in a clockwise direction until the handle 63 reaches its final position on projection 65 when the upper container 15 will be in air-tight closing condition relative to lower container 13. Any handling or lifting of the coffee maker should be done by using the handle 21, which handle may project down over the lower handle 63.

My invention comprises also a novel form of thermostat effective first to cause heating of water placed in the lower container 13 to substantially the boiling point or to 212° F., after which it is effective to maintain the temperature of the brewed coffee in lower container 13 at a temperature on the order of 160° F. or at some other desired temperature. I do this by the use of a single bimetal bar 71 which is supported at substantially its mid point as by one or more screws 73 extending through the bimetal bar 71 at substantially its mid portion and into a block 75 of electric insulating material. Block 75 is supported by a bracket 76 secured against the lower surface of bottom 19. Each end of bimetal bar 71 is provided with a contact member 77 which contact member is adapted to engage with movable contact members 79 and 81 mounted on toggle bars 83 and 85, the inner end portions of which are made sharp and adapted to have turning movement in recesses 87 and 89 in metallic members 91 and 93 which are secured against the respective sides of block 75. An over-center spring 95 is connected to the intermediate portions of toggle arms 83 and 85 in order to hold the contacts 79 and 81 in engagement with contacts 77 mounted on the two ends of the two arms of bimetal bar 71.

I provide two heating elements in the form of resistors 97 and 99 which may be positioned in heat-transferring relation to the bottom part 19 of lower container 13. The resistor 97 is of a capacity sufficient to raise the temperature of the maximum amount of water which may be placed in container 13, to about 210° F. within a reasonable length of time, while resistor 99 is of a lower heating capacity. Resistor 97 is connected to member 91 while resistor 99 is connected to member 93, the other ends of resistors 97 and 99 being connected together so that they may be connected to a terminal 101 of an electric supply circuit, the other terminal 103 of which may be connected to member 105 which is connected to the mid portion of bimetal bar 71 by screw 73. I provide adjusting means in the form of two screws 107 and 109 for the two toggle arms 83 and 85 so that upon first energizing the coffee maker both resistors 97 and 99 are energized. When the temperature of the water in container 13 has been raised to about 160° F. toggle arm 85 will move with a snap action by reason of the flexing of the right-hand portion of bar 71 so that contact 81 will be out of engagement with contact 77 on the right-hand end portion of bimetal bar 71 and resistor 99 will be deenergized. After this heating up of the water in container 13 the water temperature will continue to rise by reason of the continued energization of resistor 97 until the left-hand end of bimetal bar 71 has been flexed enough to cause turning movement of toggle arm 83 and disengagement of contact 79 with contact 77 mounted on the left-hand portion of bimetal bar 71 with attendant deenergization of heating resistor 97. Adjusting screw 107 on toggle arm 83 is adjusted so that the temperature differential of operation of the left-hand portion of the thermal control is so large that re-closing of the contacts 77 and 79 will not occur until a lower temperature of about 70° F. to 100° F. is reached. The temperature which the bimetal bar 71, and particularly the left-hand portion thereof, must reach before a clockwise movement of toggle arm 83 will take place will be that which a coffee maker is subjected to in ordinary operation.

The right-hand portion of bimetal bar 71 will cause re-engagement of contact 81 with contact 77 at a temperature of about 160° F., this being caused by adjusting screw 109 mounted on toggle arm 85. Thus it is evident that a thermal control device such as shown in Figs. 7 and 8 is effective to cause initial energization of both a high wattage as well as a low wattage resistor, the low wattage resistor being deenergized at about 160° F. after which the water in the lower container is heated up to about the boiling point when the high wattage heater is deenergized. This will permit of forcing substantially all of the water in the lower container 13 into the upper container 15 and its return to the lower container upon cooling thereof. When the temperature of the water in the lower container 13 has dropped to a value of substantially 160° F. or any other value at which it is desired to maintain the coffee, the lower wattage heater 99 is re-energized and will maintain the temperature of the fluid in the lower container at any desired value.

Referring now to Figs. 9 and 10 of the drawings, I have there shown another form of thermally actuable control switch comprising a bimetal bar 111 which is adapted to be mounted at a point intermediate its ends on a block 113 of electric insulating material by a screw 115. I provide a pair of toggle arms 117 and 119 integral with each other and secured against block 113 by rivets 121. I provide further a single high wattage heater 123 which is adapted to be connected to terminals 125 and 127 secured against block 113. Each outer end of bimetal bar 111 is provided with contacts 129 and 131 which contacts are adapted to be engaged by movable contacts 133 and 135, which are mounted on the outer ends of the respective toggle arms 117 and 119. The toggle arms 117 and 119 are provided with an intermediate portion 137 cut out of the mid portion of arms 117 and 119 and shaped so as to cause the respective toggle arms to move with a snap action. An adjusting screw 139, as well as a similar adjusting screw 141, are mounted on arms 117 and 119 and are so adjusted that arm 119 for instance will move in a clockwise direction and cause disengagement of contacts 131 and 135 when the temperature of particularly the right-hand end of bimetal bar 111 has reached a value of about 160° F., while toggle arm 117 will move in a counter-clockwise direction and cause disengagement of contacts 133 and 129 at a temperature of about 210° F. The adjustment of screw 139 is such that clockwise movement of toggle arm 117 and reengagement of contacts 129 and 133 will occur at temperatures ranging from 70° to 100° F., while counter-clockwise movement of toggle arm 119 and reengagement of contacts 135 and 131 will occur at a temperature of about 160° F.

It is evident that a snap acting thermal switch of the kind shown in Figs. 9 and 10 will control the temperature of the water and then of the brewed coffee to first of all raise the temperature of the water to close to the boiling point and then, after the coffee has been brewed, to maintain it at a lower desired value for as long as connections are maintained with a source of supply.

Various modifications may be made in the device embodying my invention without departing from the spirit and scope thereof and I desire that all such modifications coming clearly within the scope of the appended claims shall be considered a part of my invention.

I claim as my invention:

1. A vacuum type coffee maker comprising an upper and a lower container, said upper container having a liquid-conducting spout extending down into said lower container to a position near the bottom of said lower container, and means for sealing said upper container on said lower container whereby steam pressure in said lower container can force liquid therefrom into said upper container, said sealing means comprising an inturned lip at the upper end of said lower container, an out-turned lip at the lower end of said upper container for hooking under said inturned lip of said lower container and extending less than one half of the periphery of said upper container, a gasket on said inturned lip on which said upper container seats in an air-tight manner, a handle pivotally mounted on said lower container, a ring on said handle and a hook on said upper container engageable by said ring for locking said upper container on said lower container, said ring being movable into locking position by a rotation of said handle in the direction that gives an inward motion to a portion of the handle below the pivot, a stop for limiting the rotation of said handle in said direction, said handle in said locked position having a portion thereof extending outward by which the coffee maker may be lifted.

2. A coffee maker comprising a lower container, an upper container that fits thereon, said upper container including a liquid-conducting part extending down into the lower container and having an opening near the bottom of said lower container whereby steam pressure in said lower container can force liquid into said upper container, a lever-actuated locking device for fastening said containers together, a carrying handle at one side of the lower container pivoted lever-like thereon, the pivot being near the top of the handle to permit the lower end to swing toward and away from the container, said handle constituting a part of said lock and operable when swung toward said container to lock said containers together, and a stop for limiting the inward movement of said handle relative to the container to stop it in said locking position, whereby the weight of said container, when supported on said handle, holds said locking device locked.

3. A coffee maker comprising in combination separable upper and lower liquid containing receptacles, the upper container having an opening in its bottom for permitting the flow of liquid therefrom into said lower container and having also means for retaining coffee grounds therein while permitting such flow, a handle member pivoted to one of the receptacles, and means connected with the handle member and the other receptacle operated by pivoting movement of said handle for locking the receptacles together and for locking the handle member in position to serve as a handle for carrying the coffee maker.

4. In combination, a lower container, an upper container that fits thereon, said upper container having a liquid-conducting part extending down into said lower container and having an opening near the bottom of said lower container, a lever-actuated locking device for fastening said containers together, said locking device including a lever pivoted about a substantially horizontal axis at one side of the lower container and near the top thereof, said lever serving also as a carrying handle for said two containers and having a grip part below said pivot swinging toward said lower container for locking said device, and a stop for holding said grip part far enough from said lower container to permit a fist to hold said grip part, whereby when said containers are supported erect only by said handle they rest against said stop and hold said locking device locked.

5. In combination, a lower container, an upper container that fits thereon, the upper container having an opening in its bottom for permitting the flow of liquid therefrom into said lower container and having also means for retaining coffee grounds therein while permitting such flow, a lever-actuated locking device for fastening said containers together, said locking device including a lever pivoted about a substantially horizontal axis at one side of the lower container and near the top thereof, said lever serving also as a carrying handle for said two containers and having a part below said pivot swinging toward said lower container for locking said device and a stop against which said containers rest when supported erect only by said lever, said lever being L-shaped and, when against said stop, having one leg extending out substantially horizontal from said pivot and the other leg extending down from the outer end of the first leg to constitute a grip part of the carrying handle.

PHILIP E. WILLMAN.

REFERENCES CITED

The following references are of record in the file of this patent:

UNITED STATES PATENTS

| Number | Name | Date |
|---|---|---|
| 91,170 | Scholle | June 8, 1869 |
| 129,882 | Behringer | July 30, 1872 |
| 806,885 | Focht | Dec. 12, 1905 |
| 1,267,405 | Hammerstein | May 28, 1918 |
| 1,381,855 | Ashcraft | June 14, 1921 |
| 2,097,186 | Hinnenkamp | Oct. 26, 1937 |
| 2,151,407 | Lobl | Mar. 21, 1939 |
| 2,158,587 | Neviws | May 16, 1939 |
| 2,164,158 | Masin | June 27, 1939 |
| 2,212,100 | Keaton | Aug. 20, 1940 |
| 2,262,286 | Ireland | Nov. 11, 1941 |
| 2,301,917 | Johnson | Nov. 17, 1942 |
| 2,365,615 | Woodman | Dec. 19, 1944 |
| 2,410,323 | Wellman | Oct. 29, 1946 |

FOREIGN PATENTS

| Number | Country | Date |
|---|---|---|
| 1,367 | Great Britain | 1892 |